UNITED STATES PATENT OFFICE.

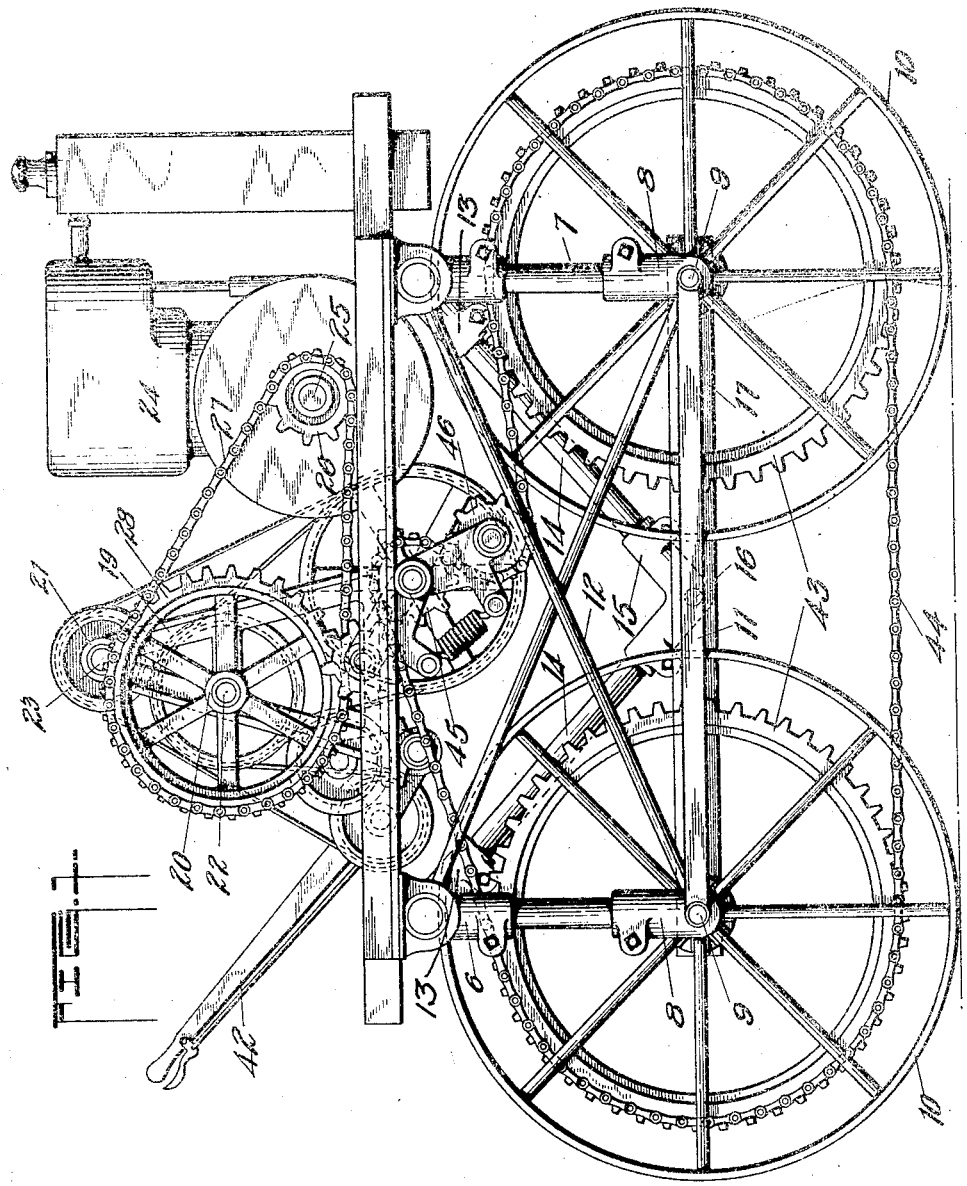

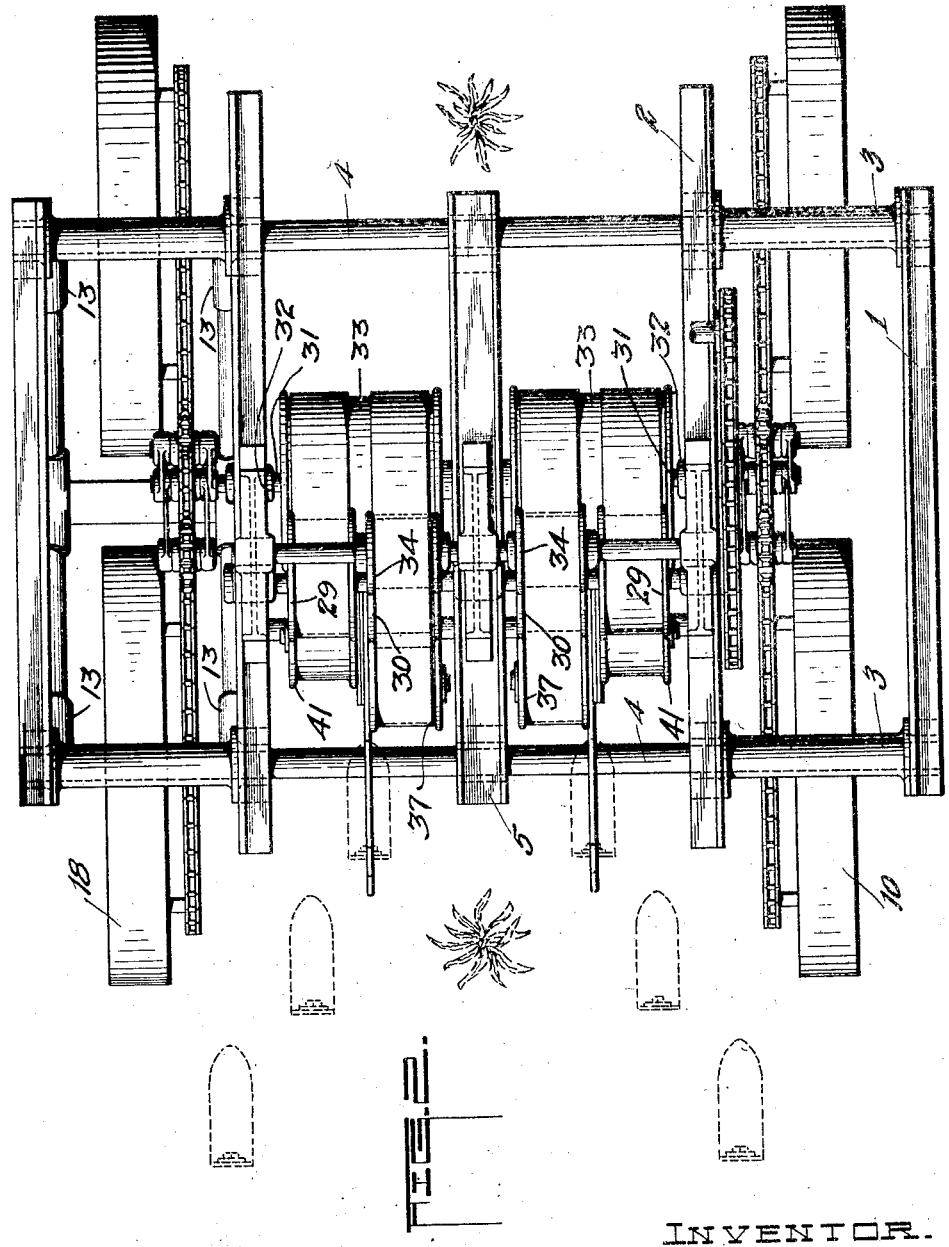

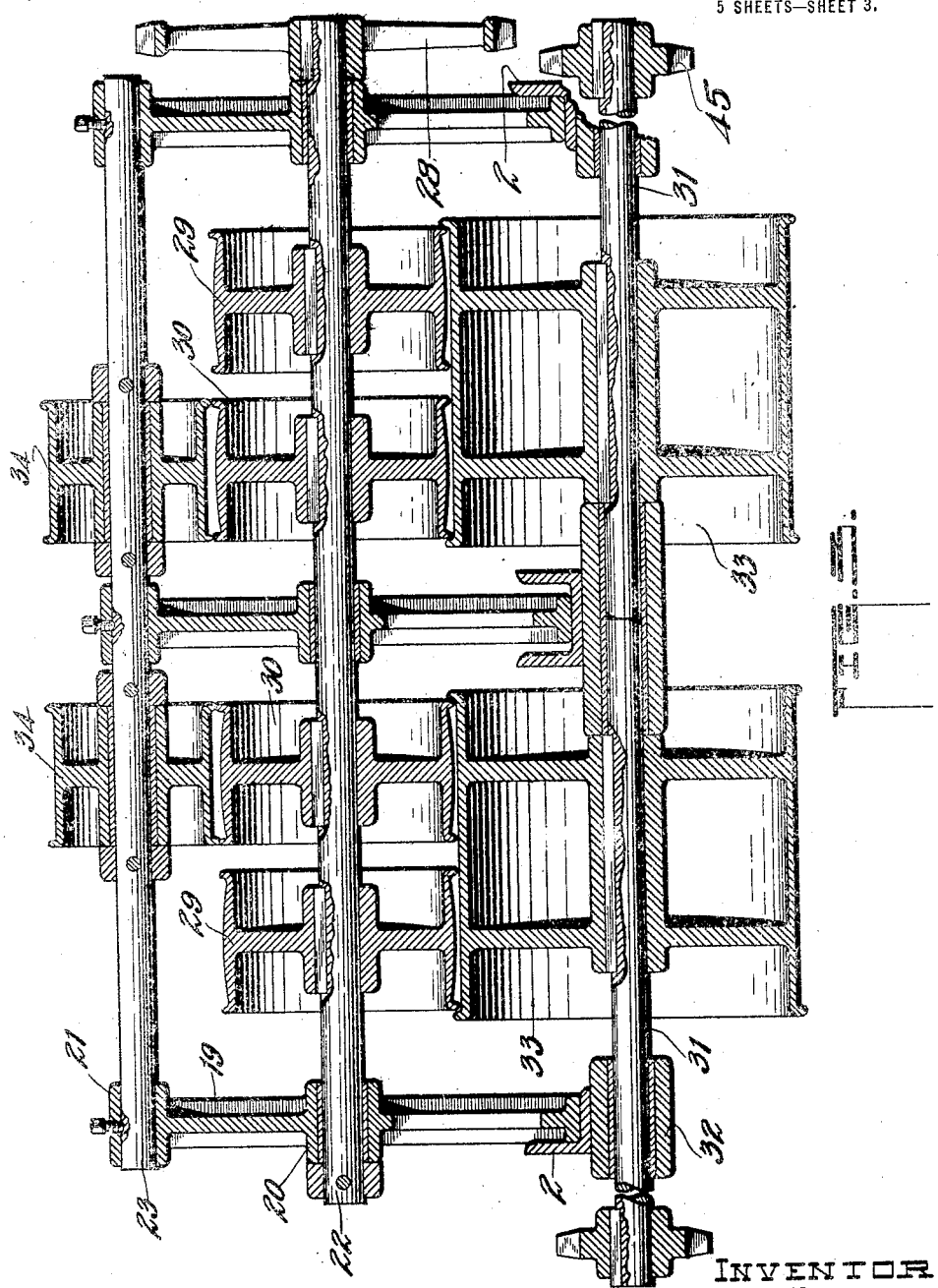

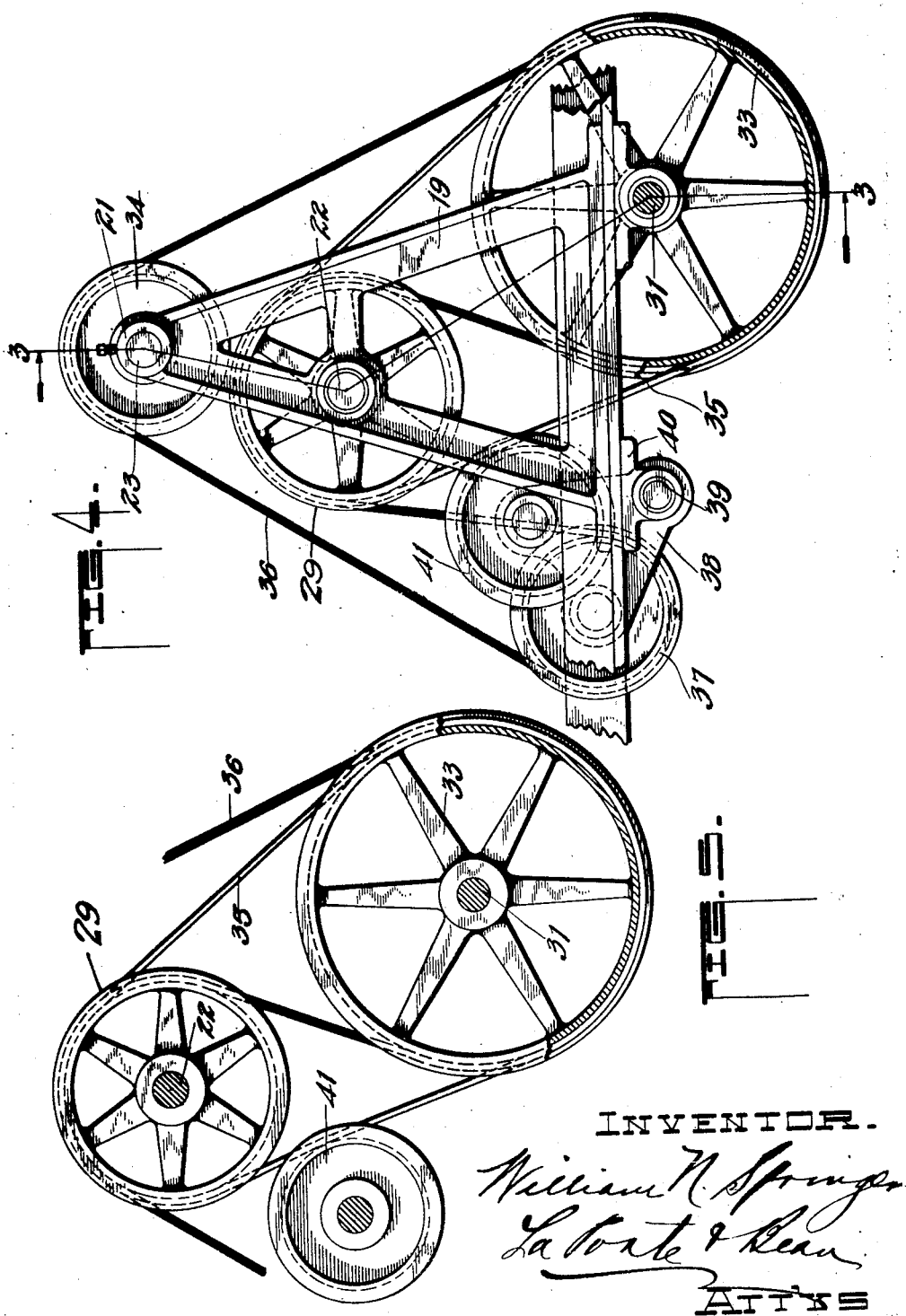

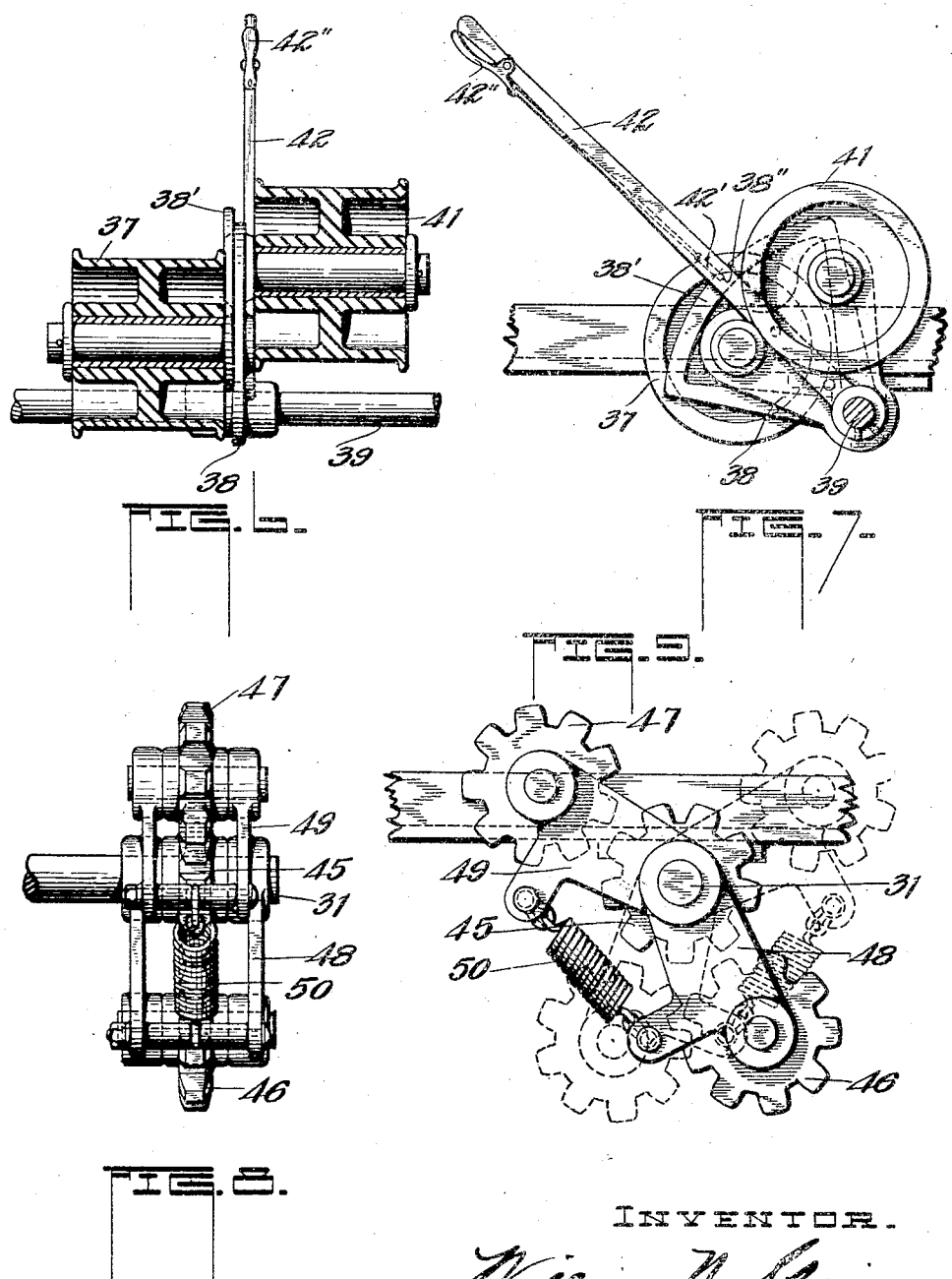

WILLIAM N. SPRINGER, OF PEORIA, ILLINOIS, ASSIGNOR TO S. K. & S. CO., OF EL PASO, ILLINOIS, A CORPORATION OF ILLINOIS.

MOTOR AGRICULTURAL IMPLEMENT.

1,371,330.  Specification of Letters Patent.  Patented Mar. 15, 1921.

Original application filed March 22, 1917, Serial No. 156,574. Divided and this application filed September 7, 1917. Serial No. 190,266.

*To all whom it may concern:*

Be it known that I, WILLIAM N. SPRINGER, a citizen of the United States, a resident of Peoria, in the county of Peoria and State of Illinois, have invented new and useful Improvements in Motor Agricultural Implements, of which the following is a specification.

This invention has reference to a motor agricultural implement, and has for its object to provide in a machine of this character, a motor frame with traction wheels adapted to be driven from both sides of the machine, said frame having a three point suspension which will permit it to accommodate itself to the irregularities of the ground over which the machine travels.

A further object of the invention is to provide a machine of this character including a transmission which is devoid of all gearing, frictional driving parts being employed throughout, and having levers whereby the operator may control the operation of said transmission and direct the movement of the machine in a forward or backward direction, and for the purpose of turning the machine in its own tracks, or upon the traction wheels at either side of the machine.

The invention has for a further object to provide a machine of the character described with traction wheels adapted to be driven from both sides of the machine, the rear traction wheels being driving wheels when the machine is being propelled in a forward direction and the front traction wheels becoming the driving wheels when the machine is propelled in a backward direction, the transmission including driving pulleys and belts, and idler pulley wheels adapted to be moved for the purpose of tightening the different belts, whereby the machine may be propelled in either a forward or backward direction.

Other objects and aims of the invention will be more fully understood from the following description and drawings forming a part thereof, in which:

Figure 1 is a side elevation of my improved motor agricultural implement, the soil engaging elements omitted;

Fig. 2 is a plan view of the same machine with the soil engaging elements shown in dotted lines;

Fig. 3 is a cross-section of the transmission, as the same would appear if taken on the line 3—3 of Fig. 4;

Fig. 4 is a side elevation, partly in section, of the transmission, showing the reversing means in action;

Fig. 5 is a side elevation, partly in section, of a part of the transmission, showing the forward driving means in action;

Fig. 6 is a detail, showing in side elevation, the belt controlling means;

Fig. 7 is a front elevation of the parts seen in Fig. 6;

Fig. 8 is a detail, showing in side elevation, the idler-tension sprocket wheels for the driving sprocket chains, and Fig. 9 is a front elevation of the parts seen in Fig. 8.

Like characters of reference denote corresponding parts throughout the figures.

*The frame.*—The frame of the machine is a three point suspension frame, and includes the following described parts: the two sets of parallel spaced, preferably angle-iron bars 1 and 2; one set of said bars being spaced from the other set the distance desired to adapt the frame to a single row cultivator, or other desired implement. Said bars 1 and 2 of each set, are connected to and held in spaced relation by means of the sleeves 3. The sleeves 3 associated with one set of bars 1 and 2 being in axial alinement with the corresponding sleeves 3 associated with the other set of bars 1 and 2, and connecting the corresponding opposite sleeves 3 of the two sets of bars 1 and 2 and having a bearing therein, are the rods 4. Mediate the two sets of bars 1 and 2, and connecting the rods 4, is a preferably channel bar 5.

Depending straight down from the opposite ends of the sleeves 3 of one set of bars 1 and 2 are coupling sleeves 6, and connected in said sleeves 6 and extending downwardly therefrom, are rods 7, the lower ends of which are connected in coupling sleeves 8, in which are journaled the short shafts 9 carrying the traction wheels 10. The frame that is supported by the wheels is a comparatively wide and a relatively short one as is clearly shown in Fig. 2. In other words the device has a short wheel base and a wide tread. It is understood, however, that this arrangement is not necessary to the operation of the device, but it makes an arrangement in which the tractor is more easily guided and turned. Spacing bars 11 connect the short shafts 9, and 12 denote angularly disposed bracing rods, see Fig. 1.

On the opposite side of the machine coupling sleeves 13, similar to the coupling sleeves 6, but inclined downwardly and inwardly, are connected to the opposite ends of the sleeves 3, and connected in said sleeves 13 and converging toward each other, are rods 14, the lower ends of which are connected in coupling sleeves 15 having a pivotal connection at 16 between spacing bars 17, and in the opposite ends of which are journaled the short shafts, similar to those designated 9, carrying the traction wheels 18, similar to the traction wheels 10.

Mounted upon and extending upwardly from the bars 2, are bearing supports 19, preferably formed with the bearings 20 and 21 in which are journaled shafts 22 and 23.

*Transmission.*—The transmission, as will become apparent, is devoid of all gearing, frictional driving parts being employed throughout. The shaft 22 is the main driving shaft in the transmission; that is, it is the shaft which receives power from the motor and transmits the same through suitable mechanism to the traction wheels 10 and 18. The motor in this instance, which is designated 24, is preferably a gasolene engine, shown only in Fig. 1, suitably supported upon the frame of the machine. The motor shaft is designated 25 and has thereon a sprocket wheel 26 engaged by the sprocket chain 27, which also engages and operates the sprocket wheel 28 keyed or otherwise secured to the driving shaft 22. On said shaft 22 on opposite sides of the central channel bar 5 are keyed or otherwise suitably secured the pulley wheels 29 and 30. The pulley wheels 29 are the driving pulleys for imparting motion from the driving shaft 22 to the traction wheels 10 and 18 to propel the machine in a forward direction, whereas the pulley wheels 30 are the driving pulleys for imparting motion from the driving shaft 22 to the traction wheels 10 and 18 to propel the machine in a backward direction.

31, 31 designate separate sections of a counter shaft suitably journaled in bearings 32 secured to the underside of the bars 2 of the frame. Keyed or otherwise suitably connected with the shaft sections 31 are pulley wheels 33. The peripheral surfaces of these last mentioned pulley wheels correspond in width to the pairs of pulley wheels 29 and 30 carried on the driving shaft 22, and loosely carried on the shaft 23 are idler pulley wheels 34 which are positioned above the driving pulley wheels 30, as best seen in Fig. 3.

Driving belts 35 pass around driving pulley wheels 29 on the driving shaft 22 and around the pulley wheels 33 on the counter shaft sections 31. Other driving belts 36 pass around the driving pulley wheels 30, down and around the pulley wheels 33, on the counter shaft sections 31, over the idler pulley wheels 34, on the shaft 23 and around idler pulley wheels 37, journaled on short shafts having a bearing in brackets or castings 38, swingable on the rod 39, secured in bearings 40 attached to the underside of the bars 2. Also journaled on short shafts having a bearing in said brackets or castings 38, are other idler pulley wheels, 41. These last mentioned pulley wheels are intended to have a frictional engagement with the forward driving belts 35. Secured to the rod 39, adjacent each bracket or casting 38 is a quadrant 38' having a single detent receiving notch 38''.

The brackets or castings 38 may be oscillated on the rod 39 for the purpose of moving the idler pulley wheels 37 and 41 in a direction toward and from the driving belts 35, by means of levers 42 which are suitably secured to the brackets or castings 38 and fulcrumed on the rod 39, see Figs. 6 and 7. These levers extend upwardly and rearwardly, see Figs. 1 and 7, so as to be within easy reaching distance of the operator, and each lever is provided with a detent or pawl 42' connected with a well known operation means 42''. The said levers 42 give the operator full control of the transmission of the machine, as by their adjustment forwardly, he is enabled to place in operation the driving belts 35 for transmitting a forward movement to the machine, and when moved in the rearward direction, to place in operation the reversing belts 36 for the purpose of transmitting a backward movement of the machine. When one or the other of the levers 42 is moved to a neutral position, that is, the position shown in Fig. 7, with the detent or pawl 42' in the notch 38'' of the quadrant, the other being in the position for the purpose of transmitting a forward movement to the machine, the operator may control the direction in which the machine may be turned. With the engine 24 in operation, power is constantly imparted to the driving shaft 22, and the driving pulleys 29 and 30, are, therefore, in motion all the time.

Connected to each of the traction wheels 10 and 18, are sprocket wheels 43 and the teeth of said sprocket wheels are engaged by sprocket chains 44 which are actuated by sprocket pinions 45 keyed or otherwise suitably secured to the ends of the counter shaft 31. The forward upper runs of these chains 44 pass down and around idler-tension sprocket pinions 46 and the rearward upper runs of these chains pass under the idler-tension sprocket pinions 47. The idler sprocket pinions 46 are carried on short shafts journaled in arms 48 and the idler sprocket pinions 47 are carried on short shafts journaled in arms 49, both of said arms being carried on and swingable about the counter shaft sections 31.

When the idler pulley wheels 41 are engaging the driving belts 35 to propel the machine in a forward direction, the idler-tension sprocket pinions 46 and 47 assume the position shown in full lines in Fig. 9, and when the said idler pulley wheels 41 are out of operative engagement with the driving belts 35 and the idler pulley wheels 37 are in a position to tighten the driving belts 36 to propel the machine in a backward direction, the idler-tension sprocket pinions 46 and 47 assume the position shown in dotted lines in Fig. 9. The arms 48 and 49 on which the respective idler sprocket pinions 46 and 47 are journaled, are maintained in operative relation for the purpose of tightening the sprocket chains 44 to drive the machine in either a forward or backward direction by means of the coil springs 50, one end of which said springs have a connection with the arms 48 and the other end connected with the arms 49. The springs 50 will permit yielding movement between the idler-tension sprocket wheels 46 and 47 and allow them to accommodate themselves to any necessary give in the chains 44 should they accidentally become clogged; thus preventing said chains 44 from breaking or becoming detached from the sprocket wheels 43. The idler sprocket pinions 46 and 47 may also serve as cleaning wheels for the chains 44 in the event they may pick up any dirt during operation.

*Operation.*—In operation when the engine 24 is in motion, power will be transmitted from the engine to the driving shaft 22 by means of the sprocket chain 27. This shaft has connected thereto, the driving pulleys 29 and 30. The operator, for the purpose of imparting forward movement to the machine, will release the detents or pawls 42' from the notches 38'' in the quadrants 38' and move the levers 42 in an upward direction, and away from him, causing the idler pulley wheels 41 to frictionally engage the driving belts 35, tightening said belts and causing motion to be imparted from the driving shaft 22 to the counter shaft sections 31, which movement, will propel the machine in a forward direction through and by means of the chains 44, operated by the sprocket pinions 45 on the counter shaft sections 31, and engaging the sprocket wheels 43 on the traction wheels 10 and 18, respectively. In the forward movement of the machine, the traction wheels 10 and 18 at the left, looking at Figs. 1 and 2, are the driving traction wheels. Should the operator desire to reverse the movement of the machine and cause it to be propelled in a backward direction, he will pull the levers 42 toward him and downwardly, removing the idler pulley wheels 41 from operative engagement with the driving belts 35 and causing the tightening of the driving belts 36 which will reverse the operation of the counter shaft sections 31. At the moment of the reversal of the sprocket chains 44, the idler sprocket pinions 46 and 47 are moved from the position shown in full lines in Fig. 9, to the dotted lines in said figure, tightening the said chains and causing the traction wheels 10 and 18, shown at the right of Figs. 1 and 2, to become the driving wheels of the machine. Should the operator wish to turn the machine in its own track, he will move one of the levers 42 forwardly to cause the idler pulley wheel 41 associated therewith, to bear against the driving belt 35 which will cause that side of the machine to be propelled in a forward direction, and he will move the other lever 42 in a reverse or backward direction, which will move the idler pulley wheel 37 associated therewith, so as to tighten the belt 36 and propel that side of the machine in a backward direction; resulting in the machine turning in its own track.

The machine having assumed its proper position, the operator by the manipulation of levers 42, may cause the machine to be propelled forwardly or backwardly by the means described. Should the operator wish to turn the machine, using either the traction wheels 10 or 18 as the pivot on which the machine will turn, he will move one of the levers 42 to a neutral position, and lock it by dropping the detent or pawl 42' in the notch 38'' of the quadrant, cutting out the operation of the driving chains 44 on that side of the machine, and move the other lever 42 on the other side of the machine, to cause the idler pulley wheel 41 to bear against the driving belt 35, which said movements will cause the machine to be turned, and when the machine has reached its proper position, the operator may then release the lever 42 and move it to a forward operating position, when the sprocket chains 44 on both sides of the machine will act as drivers, for propelling the machine forward.

It will be appreciated that the transversely extending axes provided by the short shafts 9 and about which the several traction wheels 10 and 18 rotate are all fixed angularly relative to the frame of the machine, so that the several wheels always rotate in vertical planes which are parallel with and fixed relative to the direction of travel of the machine; the steering of the machine being accomplished entirely by regulating the driving action of the driving wheels upon the two sides of the machine through the transmission mechanisms upon opposite sides thereof, which mechanisms are entirely separate and distinct from one another both structurally and functionally; as distinguished from steering by the use of a wheel or wheels rotatable about an axis or axes the angularity of which relative to the direction of travel of the device is varied to steer the device, as has heretofore commonly been the case. This construction and arrangement provides a tractor in which either end may be regarded as the front end, and which will travel equally well in either direction and may be controlled with equal facility whichever way it is moving; which has not heretofore commonly been the case in machines of the general class to which my invention relates.

In Figs. 4 and 5, the reversing driving belt 36 has been shown in black lines; whereas, the driving belt 35 has been shown in double lines. In Fig. 4, an examination of the pulley wheel 33 will show that the forward driving belt 35 is loose on said wheel; whereas, the backward driving belt 36 has an impinging relation with the peripheral surface thereof, which will transmit motion to the counter shaft sections 31. In Fig. 5, just the opposite is shown; that is the forward driving belt 35 has an impinging relation with the peripheral surface of the pulley wheel 33; whereas, the backward driving belt 36 is loose on said wheel.

With the three point suspension frame, such as I have shown and described, the machine will accommodate itself to the irregularities of the ground without placing any undue stress or strain on the machine frame, or any other operative parts thereof.

While I have not shown, except in dotted lines in Fig. 2, the ground engaging instrumentalities, or the supporting means or connections therefor on the frame, together with the means for raising and lowering said instrumentalities, it is understood that the machine will be supplied with such supporting means and mechanism.

Through the operation of the counter shaft sections 31 and sprocket pinions 45 connected thereto, the driving means, comprising essentially the chains 44 and sprocket wheels 43, may be employed to propel the machine in a forward or backward direction. The counter-shaft being made in sections, will also permit the application of power to be employed to direct one side of the machine forward and the other side backward; whereby the machine may be turned in its own track, or, the power may be applied to only one side of the machine, and the machine turned on the traction wheels on the opposite side, which serve as the pivot on which the machine will turn.

This application is a division of the application filed by me March 22nd, 1917, bearing Serial Number 156,574.

What I claim is:

1. In a motor agricultural implement, in combination, a supporting frame, traction wheels, bearings for said traction wheels, a pivoted frame for the bearings on one side only of the implement, whereby the frame will accommodate itself to the irregularities of the ground, a sprocket wheel connected with each traction wheel, chains connecting the sprocket wheels on the same side of the implement, a driving shaft, means for actuating said driving shaft, means for actuating said chains either simultaneously, or independently of each other from said driving shaft, and means for reversing said chain actuating means, whereby the front and rear traction wheels may act alternately as driving wheels.

2. In a motor agricultural implement, in combination, a supporting frame, traction wheels, a sprocket wheel connected with each traction wheel, chains connecting the sprocket wheels on the same side of the implement, a transmission including a driving shaft and a driven shaft, and pulleys and belt connections between said driving and driven shafts, said belt connections including forward driving belts and backward driving belts, means for actuating the said driving shaft, means for actuating the said chains from the driven shaft, and means for tightening either the forward or backward driving belts, whereby when the forward driving belts are in operation, the rear traction wheels are the driving wheels, and when the backward driving belts are in operation, the front traction wheels are the driving wheels.

3. In a motor agricultural implement, in combination, a supporting frame, traction wheels, a sprocket wheel connected with each traction wheel, chains connecting the sprocket wheels on the same side of the implement, a transmission including a driving and a driven shaft, and pulleys and belt connections between said driving and driven shafts, means for actuating said driving shaft, sprocket wheels on the driven shaft engaging the sprocket chains for operating the traction wheels, idler-tension sprocket wheels for said chains, said last mentioned wheels supported from said driven shaft, and a controlling means in said transmission, including idler wheels and operators' levers.

4. In a motor agricultural implement, in combination, a supporting frame, traction wheels, a sprocket wheel connected with each traction wheel, chains connecting the sprocket wheels on the same side of the implement, a transmission, including a driving shaft and a driven shaft, and pulleys and belt connections between said driving and driven shafts, said belt connections comprising forward driving belts and backward driving belts, means for actuating said driving shaft, sprocket wheels on the driven shaft engaging said sprocket chains, a pair of idler-tension sprocket wheels for each chain, means for swingably supporting said last mentioned wheels on said driven shaft, and means for placing in operation, either the forward driving or backward driving belts, said idler-tension sprocket wheels accommodating themselves to the upper runs of the chains, whereby when the forward driving belts are in operation, the rear traction wheels will be the driving wheels and when the backward driving belts are in operation, the front traction wheels will be the driving wheels.

5. In a motor agricultural implement, in combination, a supporting frame, traction wheels, a sprocket wheel connected with each traction wheel, chains connecting the sprocket wheels on the same side of the implement, a transmission, including a driving shaft and a two-part driven shaft, and pulleys and belt connections between said driving and two-part driven shafts, there being forward and backward driving belts between the driving shaft and each of said sections of the two-part driven shaft, means for actuating said driving shaft, driving connections between one of the sections of said two-part driven shaft and one of said sprocket chains, and driving connections between the other section of said two-part driven shaft and the other of said sprocket chains, and a controlling means in said transmission, including idler wheels and operators' levers, there being a lever associated with each of said forward and backward driving belts.

6. In a motor agricultural implement, in combination, a supporting frame, traction wheels, a sprocket wheel connected with each traction wheel, chains connecting the sprocket wheels on the same side of the implement, a transmission, including a driving shaft and a two-part driven shaft, and pulleys and belt connections between said driving and two-part driven shafts, said belt connections comprising a forward and backward driving belt between said driving shaft and each of the sections of said two-part driven shaft, a pair of idler-tension sprocket wheels for each sprocket chain, an arm supporting each idler tension sprocket wheel, a pair of said arms being swingable about one of the sections of said two-part shaft and the other pair being swingable about the other section of said two-part driven shaft, means yieldingly connecting each pair of arms, and a controlling means in said transmission, including idler wheels and operators' levers, there being an operator's lever for each set of forward and backward driving belts.

7. In a motor agricultural implement, in combination, a supporting frame, traction wheels, a transmission, including a driving shaft and a two-part driven shaft, means for actuating said driving shaft, two pairs of pulley wheels connected to rotate with said driving shaft, one pulley of each pair constituting a forward driving pulley and the other a backward driving pulley, a pulley wheel connected to rotate with each section of said two-part driven shaft, each of said last mentioned pulley wheels receiving both the forward and backward driving belts adapted to be actuated by the forward and backward driving pulleys on said driving shaft, idler pulley wheels for the backward driving belts disposed above said driving shaft, a pair of idler pulley wheels associated with each set of forward and backward driving belts and adapted to receive the same, a controlling means including a lever for moving said last mentioned pulley wheels, the movement of said pulley wheels in one direction placing the forward driving belts in operation, and the movement of the same in an opposite direction, placing said backward driving belts in operation, driving connections between one section of said two-part driven shaft and one set of traction wheels, and driving connection between the other section of said two-part driven shaft and the other set of said traction wheels.

8. In a motor agricultural implement, in combination, a supporting frame, traction wheels, a transmission, including a driving shaft and a two-part driven shaft, driving connections between one section of said two-part driven shaft, and one set of said traction wheels and driving connections between the other section of said two-part driven shaft and the other set of said traction wheels, two pairs of pulleys connected to rotate with said driving shaft, one pulley of each set constituting a forward driving pulley and the other pulley of each set constituting a backward driving pulley, pulleys connected to rotate with each section of said two-part driven shaft, a forward and a backward driving belt between the pulleys on the driving shaft and pulleys on the sections of said two-part driven shaft, an idler pulley for each forward driving belt, and a pulley for each backward driving belt, a common pivotal support for each pair of idler wheels, a lever for moving each pair of idler wheels, the movement of said levers in one direction placing the forward driving belts in operation and the movement of said levers in an opposite direction, placing said backward driving belts in operation, and means for locking each of said levers in a neutral position.

9. In a motor agricultural implement, in combination, a supporting frame, traction wheels, a sprocket wheel connected with each traction wheel, chains connecting the sprocket wheels on the same side of the implement, a transmission including a driving shaft and a two-part driven shaft, friction driving means between said driving shaft and one section of said two-part driven shaft, for driving the machine in a forward and backward direction, a friction driving means between said driving shaft and the other section of said two-part driven shaft for driving the machine in a forward and backward direction, a driving connection between one section of said two-part driven shaft and one of said sprocket chains, a driving connection between the other section of said two-part driven shaft, and the other driving chain, means for controlling said forward and backward friction driving means between said driving shaft and one section of said two-part driven shaft, and other controlling means between said forward and backward friction driving means between said driving shaft, and the other section of said two-part driven shaft.

10. In a power propelled machine and in combination therein, a supporting frame; four driving wheels located two upon each side of the machine and constituting the sole support for said frame; four sprocket wheels carried one by each of said driving wheels and rotating therewith; an engine carried by said frame; and transmission mechanism through which all of said driving wheels are driven from said engine; said transmission mechanism including two sprocket pinions located one upon each side of the machine, and two sprocket chains located one upon each side of the machine and extending as to each of them about a sprocket pinion and about the two sprocket wheels aforesaid upon the side of the machine in question.

11. In a power propelled machine and in combination therein, a supporting frame; two traction wheels located upon one side of the machine; a driven shaft operatively connected with said two wheels to drive both of them; two other traction wheels located upon the other side of the machine, said traction wheels constituting the sole support for said frame; another driven shaft operatively connected with said second mentioned two wheels to drive both of them; an engine driven driving shaft; manually controllable means intermediate said driving shaft and one of said driven shafts and through which said driven shaft may be independently driven in either a forward or in a reverse direction, or permitted to remain at rest relative to said driving shaft; and manually controllable means separate and distinct from said first mentioned means and arranged intermediate said driving shaft and the other of said driven shafts and through which said second mentioned driven shaft may be independently driven in either a forward or in a reverse direction, or permitted to remain at rest relative to said driving shaft.

12. In a power propelled machine and in combination therein, a supporting frame; traction wheels disposed one upon each side of the machine; an engine driven driving shaft; two driven shafts one operatively connected with each of said traction wheels to drive the same; and two power transmitting devices, one associated with each of said driven shafts, and which devices are arranged intermediate said driving shaft and said driven shafts and through which devices said driven shafts may be driven each independently of the other either in a forward or in a reverse direction, or permitted to remain at rest relative to said driving shaft; each of said power transmitting devices comprising two normally loose belts, pulleys associated with said driving and driven shafts and about which said belts extend, and manually operable belt tightening mechanism whereby one or the other of said belts may be tightened.

13. In a power propelled machine and in combination therein, a supporting frame; four wheels located two upon each side of and whereby said frame is supported, and which wheels are rotatable each about an axis extending transverse to and which is fixed relative to the frame of the machine; an engine carried by said frame; driving mechanism through which wheels upon opposite sides of the machine may be independently driven either in a forward or in a reverse direction and which mechanism includes two pairs of normally loose belts associated one pair with the wheels upon each side of the machine, and two pulleys about which each belt extends; and two manually operable belt tightening devices associated one with each pair of belts and adapted to tighten one or the other of them.

14. In a motor agricultural implement, in combination, a supporting frame, traction wheels and means for propelling the same, supports extending straight down from approximately each corner on one side of the frame to provide bearings for the traction wheels on that side of the implement, spacing bars connecting the lower ends of said supports, bearings for the traction wheels on the opposite side of the implement, spacing bars connecting said last mentioned bearings, and supports between said last mentioned spacing bars and the supporting frame, said supports converging downwardly from approximately opposite corners on the same side of the frame, and having a common pivot with said last mentioned spacing bars mediate their ends.

15. In a motor agricultural implement, in combination, a supporting frame comprising two sets of parallel spaced bars and means connecting the same, traction wheels and means for propelling the same, bearings for the traction wheels on one side of the implement, supports for said bearings, said supports depending from approximately the opposite ends of one set of said parallel spaced bars, bearings for the traction wheels on the opposite side of said implement, spacing bars connecting said last mentioned bearings, and supports between said spacing bars and the other set of said parallel spaced bars, said supports converging downwardly from approximately the opposite ends of said parallel spaced bars and pivotally connected with said spacing bars mediate their ends.

16. In a motor agricultural implement, in combination, a supporting frame comprising two sets of parallel spaced bars, spacing sleeves between each set of bars and rods connecting the sleeves of one set of bars with the sleeves of the other set of bars; coupling members depending from each of said sleeves, the coupling members from one set of sleeves converging toward each other, rods connected with said coupling members on one side of the machine and at their lower ends connected with bearings for traction wheels, traction wheels journaled in said bearings, other rods connected with said converging coupling members, converging toward each other, bearings for other traction wheels, traction wheels journaled in said bearings, spacing bars connecting said last mentioned bearings, means for pivotally connecting the lower ends of said converging rods with said spacing bars.

17. In a motor agricultural implement, in combination, a supporting frame, traction wheels and means for propelling the same, a rigid frame forming bearings for the traction wheels on one side of the implement, a frame on the opposite side of the implement in which the traction wheels for that side of the implement have a bearing, said last mentioned frame pivoted mediate its ends, whereby the frame will accommodate itself to the irregularities of the ground.

18. In a motor propelled agricultural implement, a supporting frame; a plurality of traction wheels supported from one side of said frame and in substantially fixed relation thereto; a second frame located upon the side of the implement opposite that from which said above mentioned traction wheels are supported; a second plurality of traction wheels supported from said second frame; a pivotal connection between said first mentioned and said second mentioned frame whereby relative movement of said frames is permitted; and a motor carried by said first mentioned frame and adapted to drive said several traction wheels.

19. A power propelled machine comprising a frame, traction elements associated with said frame, a pair of jack shafts operatively connected to said traction elements, driven pulleys fixed on said jack shafts, a counter shaft, a pair of reverse drive pulleys on said counter shaft, a pair of forward drive pulleys on said counter shaft, idler pulleys suitably mounted and in line with said forward drive pulleys, a pair of belts connecting said reverse drive pulleys with pulleys on said jack shafts, a pair of belts connecting said forward drive and said idler pulleys with pulleys on said jack shafts, and a source of power operatively connected to said counter shaft.

20. A power propelled machine comprising a frame, traction elements associated with said frame, a pair of jack shafts operatively connected to said traction elements, driven pulleys fixed on said jack shafts, a counter shaft, a pair of reverse drive pulleys on said counter shaft, a pair of forward drive pulleys on said counter shaft, idler pulleys suitably mounted and in line with said forward drive pulleys, a pair of belts connecting said reverse drive pulleys with pulleys on said jack shafts, a pair of belts connecting said forward drive and said idler pulleys with pulleys on said jack shafts, a source of power operatively connected to said counter shaft, and means for controlling the drive from said counter shaft to said jack shafts for independent forward, neutral or reverse drive.

21. In a tractor, the combination of a frame, traction means mounted on each side thereof, a power shaft, independent transmission mechanisms between said shaft and the traction means, each comprising a belt drive for forward and reverse driving, and gearing connecting said belt drive to the traction means on the corresponding side of the frame, substantially as described.

22. In a tractor, the combination of a frame, axles rigidly mounted on said frame, wheels on said axles at each side of the frame, a motor, independent transmission mechanisms between said motor and the traction wheels at each side of the frame, each comprising a belt drive, reducing gearing connecting said belt drive to a traction wheel on the corresponding side of the frame, and means associated with the belt drive for neutral, forward or reverse drive of said wheels, substantially as described.

23. In a tractor, the combination of a frame, a plurality of axles rigidly mounted on said frame at each side thereof, traction wheels on said axles, a shaft, a motor carried by said frame for rotating said shaft in one direction only, independent transmission mechanisms between said shaft and said traction wheels, each comprising a friction drive, gearing connecting said friction drive with all the wheels on the corresponding side of the tractor, and means associated with said friction drive for neutral, forward and reverse driving of said traction wheels, substantially as described.

24. In a tractor, a relatively wide and comparatively short frame, a motor carried by said frame, front and rear axles rigidly mounted on said frame, traction wheels on said axles, and gearing means connected to said motor for driving the wheels on each side of the frame either forward or backward independently of the wheels on the other side of the frame, and means for engaging and disengaging said gearing means.

25. In a tractor, a relatively wide and comparatively short inverted U-shaped frame, a plurality of axles rigidly mounted on the depending portions of said frame at each side thereof and carrying ground engaging wheels, a power shaft, a motor carried by said frame for turning said shaft in one direction only, independent gearing means between said shaft and the wheels on the corresponding side of said frame, and means for engaging and disengaging each set of the gearing means independently of the other, whereby all the wheels on one side of the frame may be driven either forwardly or backwardly from said shaft, independently of those on the other side of the frame.

26. In a tractor, the combination of a power shaft and independent driving means between said shaft and a ground wheel on each side of the tractor, each driving means consisting of a belt drive and reducing gearing between said belt drive and a ground wheel.

27. In a tractor, a comparatively wide and relatively narrow inverted U-shaped frame, solely supported on ground engaging wheels mounted on axles secured to the depending portions of said frame, said axles being fixed relatively to the planes of said portions whereby said wheels are maintained in parallel planes, a power shaft, a motor carried by said frame for turning said shaft in one direction only, and independent means operated by said power shaft for neutral, forward and reverse drive for all the wheels at one side of the frame, independently of those at the other side of the frame.

28. In a device of the class described, a frame, front and rear wheels mounted on axles fixed to said frame, and constituting its sole support, the arrangement of said wheels being such that the tread is greater than the wheel-base, a motor carried by said frame and mechanism operated by said motor for independently driving a wheel at each side of the frame, and manually operated means for controlling said mechanism, substantially as described.

29. In a tractor, a frame, a plurality of non-dirigible traction wheels mounted on said frame at each side thereof, and constituting its sole support, the wheels on each side being in close proximity to each other, the frame having its greatest dimensions transverse to the line of travel, a motor carried by said frame, independent transmission mechanism between said motor and the traction wheels, each including a belt drive and a gearing between the belt drive and all the wheels on the corresponding side of the tractor, and manually operated means associated with the belt drive for forward, neutral and reverse drive of said wheels, substantially as described.

30. In a tractor, a frame supported solely by a plurality of traction wheels on each side thereof, a motor carried by said frame, gearing means operatively connected to said motor for simultaneously operating all the wheels on one side of the tractor independently of those on the other side thereof, and unitary means for independently and simultaneously controlling said gearing means for the wheels at each side of the tractor, substantially as shown and described.

31. In a tractor, a frame, a motor carried by said frame, a set of traction wheels at each side of said frame constituting its sole support, gearing for each set of wheels, and means for operatively connecting the gearing for the respective set of wheels with the motor for causing the wheels of one set when so connected to rotate simultaneously at all times, and simultaneously with, or independently of, the wheels of the other set, substantially as described.

32. In a tractor, a frame, a motor carried by said frame, a set of traction wheels at each side of the frame constituting its sole support, transmission mechanism connecting the motor with the wheels of each set, said mechanism including gearing for each set of wheels to cause the wheels of the respective set to rotate simultaneously and means for connecting each set of gearing with the motor for causing the wheels of one set to rotate simultaneously with or independently of the wheels of the other set.

33. In a tractor, a frame, a motor carried by said frame, traction means for supporting the frame, said means consisting of traction wheels constituting the sole support and ground engaging members for said tractor, interconnected gearing permanently connected to the whole traction means at one side of the tractor independently of the means at the other side thereof, and manually controlled means for connecting the gearing with said motor for driving the whole traction means at one side of the tractor independently of, or simultaneously with, the traction means at the other side thereof, substantially as described.

34. In a tractor, the combination of a frame, traction means mounted on each side thereof, a motor carried by said frame, independent transmission mechanism between said motor and the traction means at each side of said frame, said mechanism each including a belt loosely engaging pulleys and means for independently tightening the belts whereby the traction means at one side of the frame may be driven at the same speed as, or at a lesser speed than, the traction means at the other side of the frame, substantially as shown and described.

35. In a tractor, the combination of a frame, traction means mounted on each side thereof, a motor, independent transmission mechanism between said motor and the traction means at each side of the frame, said mechanism each including belts loosely engaging reduction pulleys for independently driving the traction means at each side of the frame either forward or reverse, and means for independently tightening said belts substantially as and for the purpose set forth.

In witness whereof, I have hereunto affixed my hand this 4th day of September, 1917.

WILLIAM N. SPRINGER.